D'ORSAY McC. WHITE.
HYDROCARBON MOTOR.
APPLICATION FILED NOV. 24, 1916.

1,377,378.

Patented May 10, 1921.
4 SHEETS—SHEET 1.

INVENTOR
D. McCALL WHITE
BY
ATTORNEY

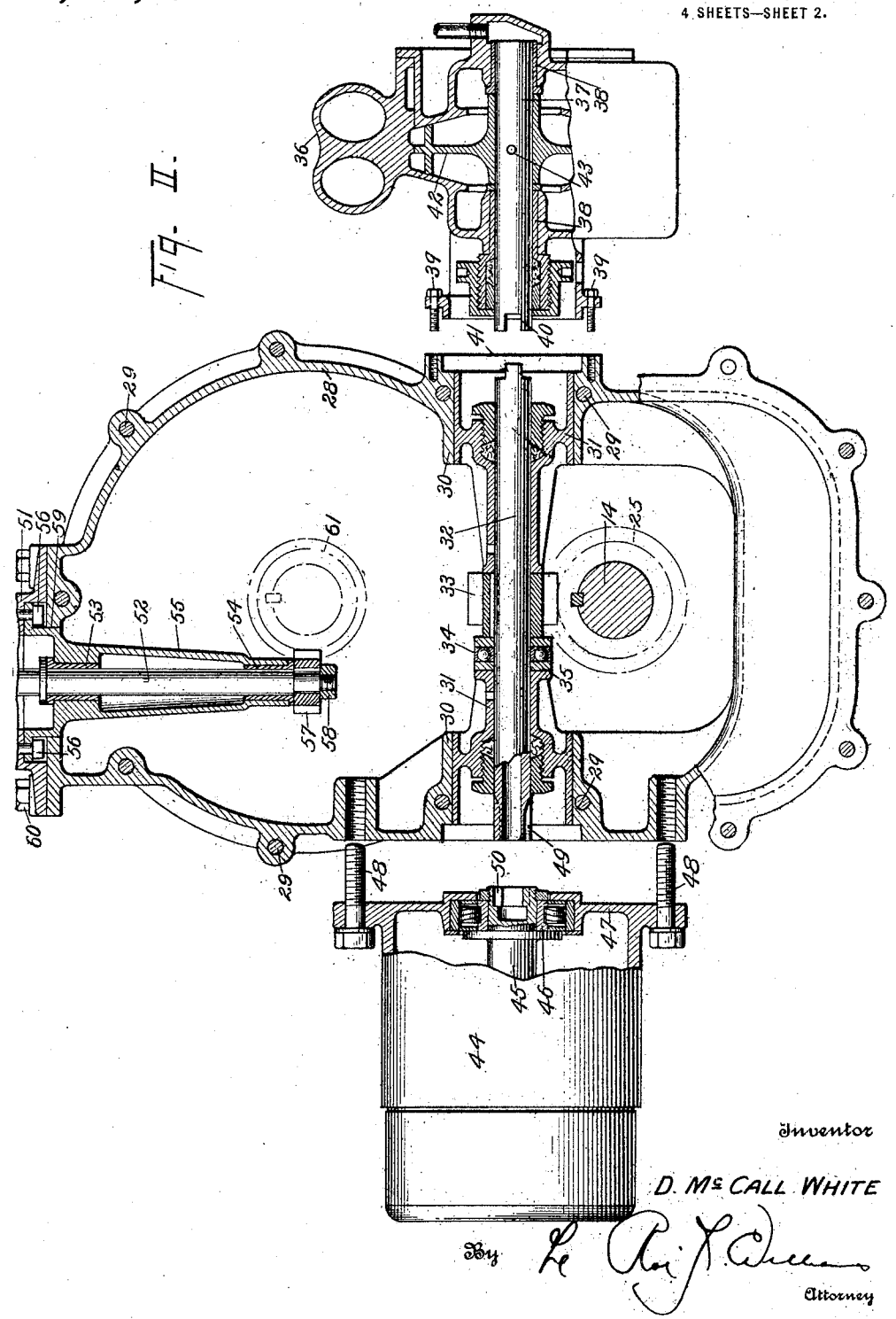

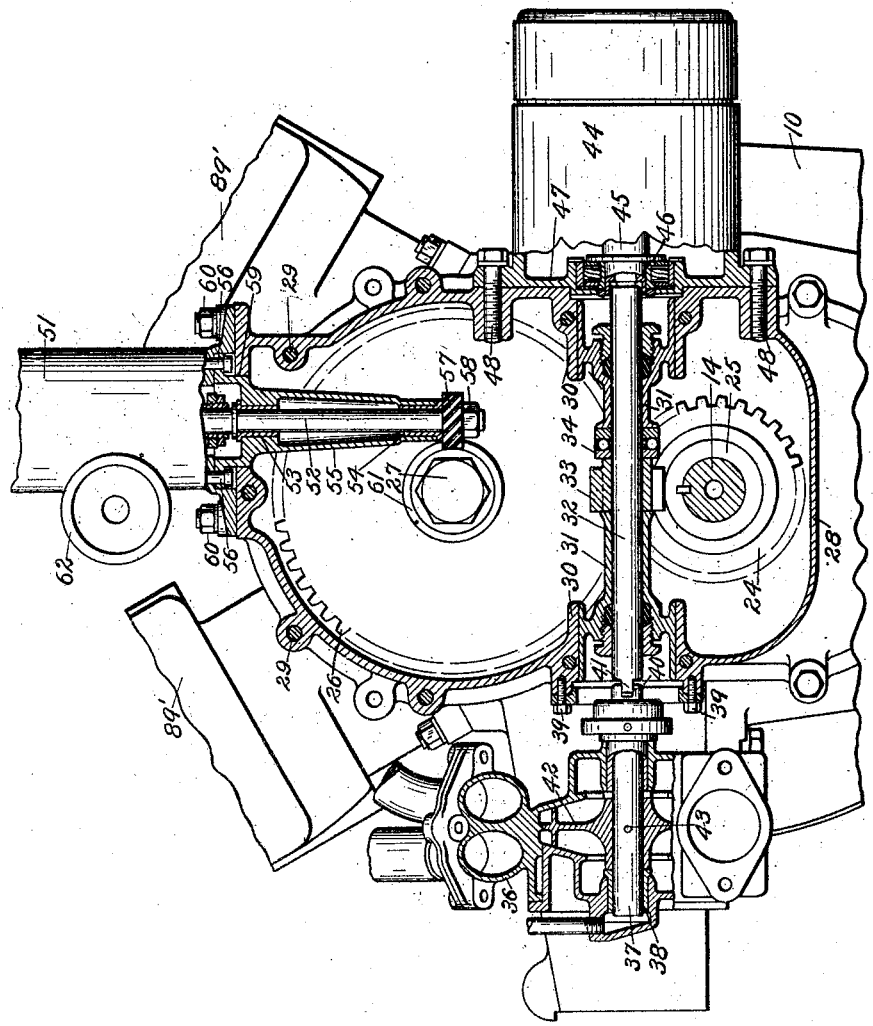

D'ORSAY McC. WHITE.
HYDROCARBON MOTOR.
APPLICATION FILED NOV. 24, 1916.
1,377,378.
Patented May 10, 1921.
4 SHEETS—SHEET 4.
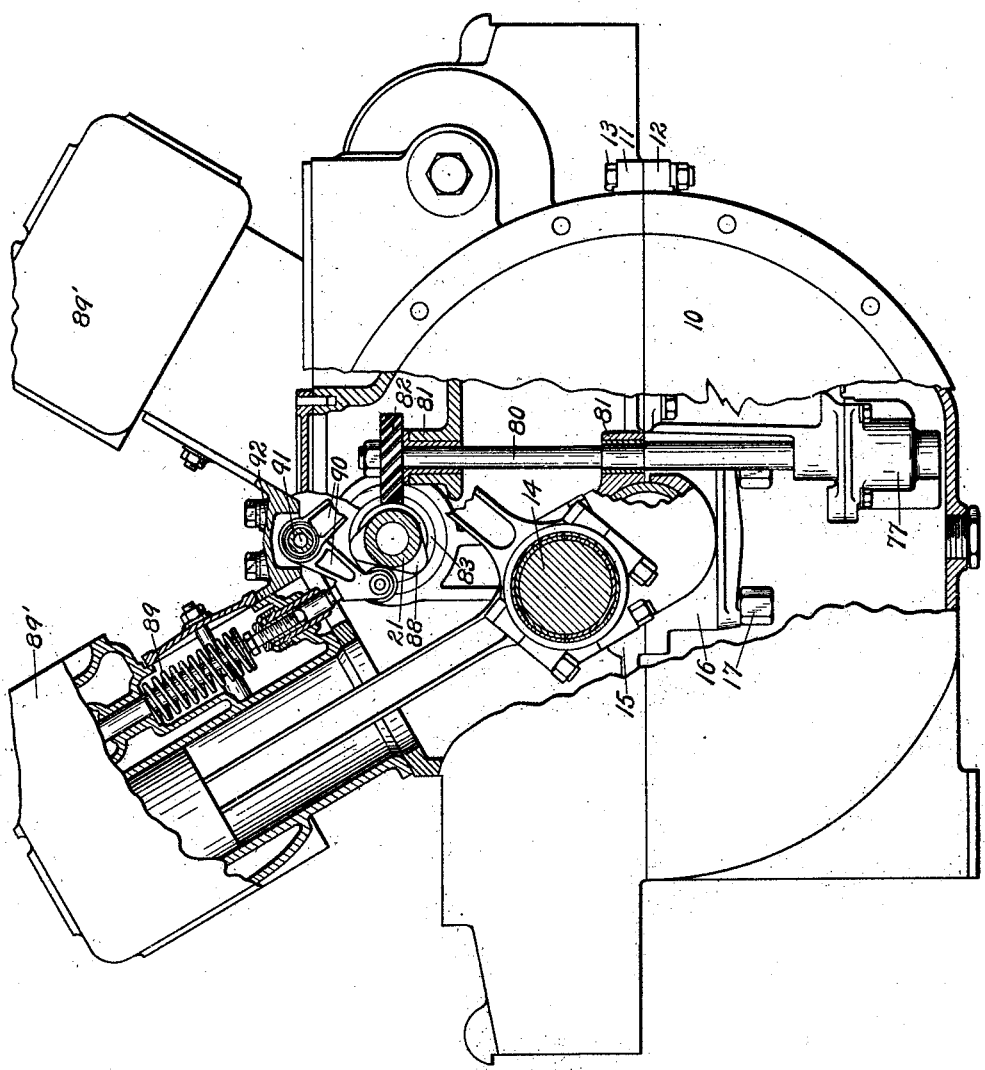
FIG. IV.
INVENTOR
D. McCALL WHITE
ATTORNEY

UNITED STATES PATENT OFFICE.

D'ORSAY McCALL WHITE, OF DETROIT, MICHIGAN, ASSIGNOR TO CADILLAC MOTOR CAR COMPANY, OF DETROIT, MICHIGAN, A CORPORATION OF MICHIGAN.

HYDROCARBON-MOTOR.

1,377,378. Specification of Letters Patent. Patented May 10, 1921.

Application filed November 24, 1916. Serial No. 133,184.

*To all whom it may concern:*

Be it known that I, D'ORSAY MCCALL WHITE, a loyal subject of the King of England, and resident of Detroit, Wayne county, State of Michigan, have invented certain new and useful Improvements in Hydrocarbon-Motors, of which the following is a specification.

This invention relates to hydrocarbon motors.

One of the objects of this invention is to provide a motor with novel, improved, efficient, and easily accessible drives and mountings for its various units or accessories.

This and various other objects will appear from the following description, taken in connection with the drawings which form a part of this specification, and in which:

Fig. 2 is a transverse sectional view, with portions in partially disassembled relation, substantially on the line 2—2 of Fig. 1, looking toward the right;

Fig. 3 is a transverse vertical section substantially on the line 2—2 of Fig. 1, looking toward the left; and Fig. 4 is an end view of the power plant, with portions broken away, substantially on the line 4—4 of Fig. 1.

Figure 1:
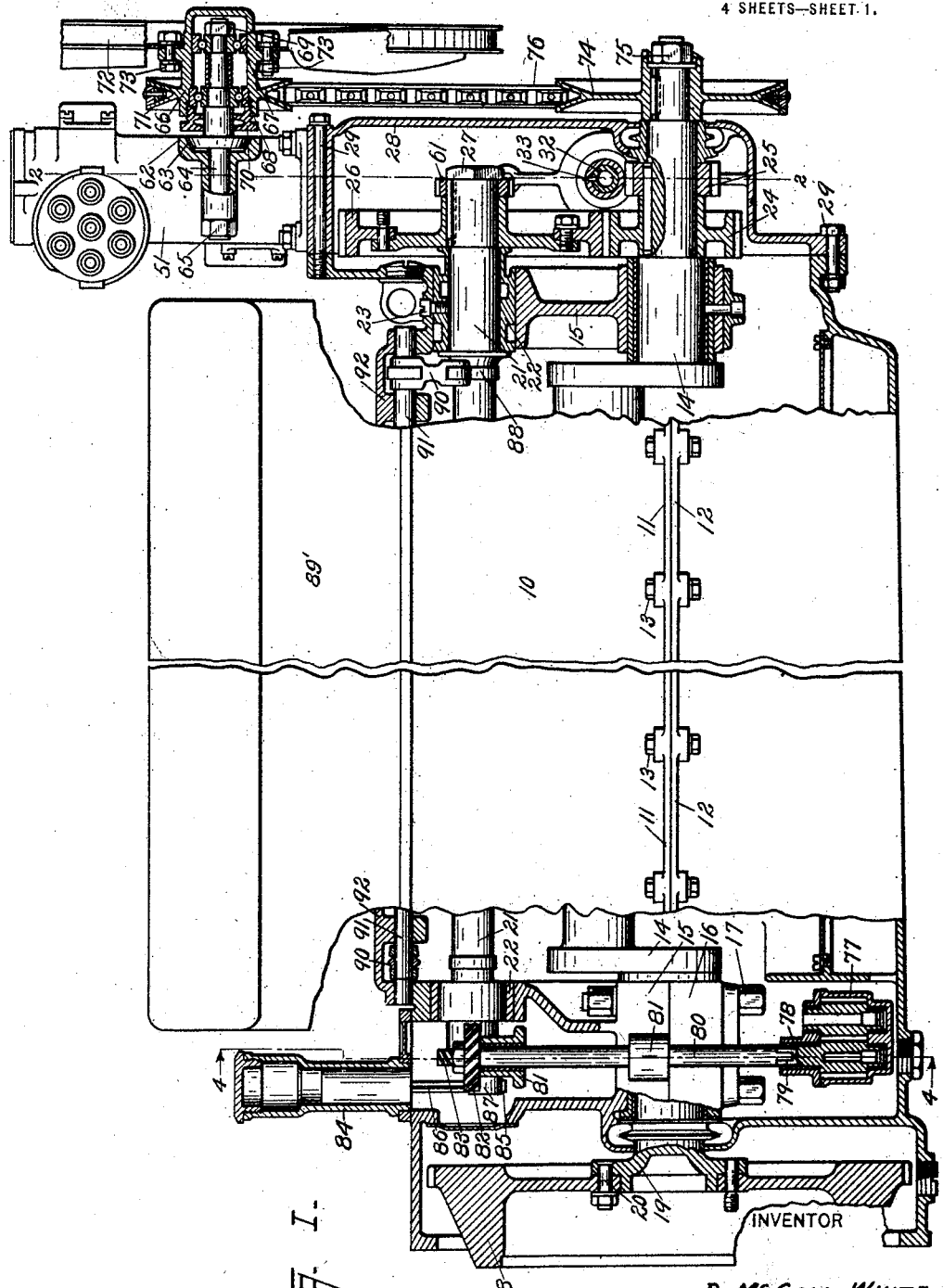
Figure 1 is a side elevation (with portions broken away and others in section) of my improved power plant.

Referring to the drawings, 10 is a crank case having two parts secured together in its median plane by integral flanges 11 and 12 and bolts 13. A crank shaft 14 is arranged in integral crank case bearings 15 and suitably secured in position by the well-known bearing caps and bolts 16 and 17, respectively. The usual flywheel 18 may be secured to a flange 19 of the crank shaft by means of bolts 20. A cam shaft 21 is arranged in crank case bearings 22 above and in the same vertical plane with the crank shaft 14. The cam shaft 21 may be assembled in its bearings by an endwise movement of the shaft and secured in position by means of a bolt 23. A pair of gears 24 and 25, respectively, may be keyed or otherwise secured on the crank shaft 14 adjacent its forward end. The gear 24 is adapted to mesh directly with another gear 26 suitably secured as by a bolt 27 to the cam shaft 21, for driving the latter from the crank shaft at a 2 to 1 ratio.

A cover 28 is adapted to be secured to the front end of the crank case 10 by bolts 29, for housing the gearing at the front end thereof. The cover 28 is provided with oppositely-disposed inwardly-extending bosses 30, in which may be suitably arranged a pair of radial bearings 31 for supporting, in transverse relation to the crank shaft 14, another shaft 32, which has keyed or otherwise suitably secured intermediate its ends, a gear 33 adapted to mesh directly with the gear 25 on the crank shaft. A bearing 34 may be placed between the gear 33 and the inner face 35 of one of the radial bearings 31, for resisting the lateral thrust of the shaft 32.

A pump, comprising a casing member 36 having a shaft 37 with an impeller 42 secured thereto by a pin 43 is arranged in bearings 38. The entire casing unit then is adapted to be mounted on and secured to the cover member 28 by means of bolts 39. The pump shaft is provided at its inner end with a groove or slot 40 having a slidable connection with a tongue 41 formed on one end of the transverse shaft 32.

Another self-contained accessory unit, in the form of an electrical generator 44 having a shaft 45 suitably mounted in bearings 46 in its casing member 47, may be secured as by bolts 48 to the opposite side of the cover member 28. The other end of the transverse shaft 32 is provided with splines 49 slidably fitting within the complementary driving portions 50 formed in the inner end of the shaft 45.

It will be noted from the foregoing that the pump 36 and the generator 44 are independent units which are adapted to be detachably secured to the cover member 28 in driven relation with the transverse shaft 32 which is also mounted on the cover member 28.

There is also another accessory or driven unit, in the form of an electrical distributer, comprising a housing 51 in which may be vertically arranged a shaft 52 supported by a pair of bearings 53 and 54, respectively, in a sleeve 55, this sleeve being detachably secured as by bolts 56 to the lower portion of the housing 51. A spiral gear 57 may be suitably keyed and secured to the lower end of the shaft 52 as by a nut 58. The inwardly-extending bearing sleeve 55 is adapted to be inserted in an opening 59 arranged in the upper portion of the cover member 28, and the distributer as a unit detachably secured to the cover member 28 as by bolts 60. It will be noted that with the parts in this relation the distributer gear 57 is in direct mesh with a gear 61 formed integral with the cam shaft gear 26 and to be driven thereby. The distributer housing 51 has formed therein a boss 62 having a cone 63 in which may be fitted and suitably mounted a shaft 64 which is suitably secured in position as by means of a nut 65. A spool or hub 66 is supported on a pair of anti-friction bearings 67 and 68 on the shaft 64 and secured in position by means of nuts 69 and 70. A driven pulley 71 is formed on the spool 66, and a fan 72 may be secured thereto as by bolts 73. A pulley 74 may also be keyed to the forward end of the crank shaft 14 exteriorly of the cover member 28 and secured in position by a nut 75. A belt 76 connects the pulleys 71 and 74 in driving relation.

A gear pump 77 of any well-known construction may be arranged in the lower rear portion of the crank case 10, with its shaft 78 secured through a pin-and-slot connection 79 to a vertically-arranged shaft 80 which is mounted in a pair of bearings 81 in the crank case. A spiral gear 82 may be suitably secured to the upper end of the shaft 80 in mesh with another similar gear 83 on the rear end of the cam shaft 21.

A pneumatic pump 84 of the usual form is adapted to have the lower end 85 of its pitman 86 directly connected with a cam stud 87 also at the rear end of the cam shaft 21.

The usual cams 88 are adapted to drive the well-known puppet valve mechanism 89 in the cylinders 89' through rocker arms 90 pivotally arranged on a shaft 91 in the crank case 10 and the cap member 92, respectively.

While I have described and will specifically claim what I deem to be a preferred embodiment of my invention, it will be obvious to those skilled in the art that various modifications and changes may be made without departing from the spirit and scope thereof.

Having thus described my invention, what I claim and desire to secure by Letters Patent is:

1. In a hydrocarbon motor, the combination with a crank case, a crank shaft mounted therein, and gearing arranged on said shaft adjacent one of its ends, of a detachable end cover for said gearing, a shaft mounted in said cover transversely of said first shaft, a removable pulley mounted on said crank shaft outside of said cover, driving connections between said crank shaft and said transverse shaft and said pulley, respectively, an auxiliary device also supported on said cover, and means for driving said device from said pulley.

2. In a hydrocarbon motor, the combination with a crank case, a crank shaft mounted therein, gearing arranged adjacent one end of said shaft, a detachable end cover for said gearing, a removable pulley arranged on an extension of said shaft outside said cover, of a fan shaft detachably mounted upon said cover outside and above said cover, and driving means connecting said pulley with said fan shaft.

3. In a hydrocarbon motor, the combination with a crank case, a crank shaft mounted therein, gearing arranged on said crank shaft adjacent one of its ends, of a detachable end cover for said gearing and an electrical device mounted on said cover having a shaft in a substantially vertical plane, and geared connections between said shafts, said cover being open to the interior of the crank case and sealing the end of the latter.

4. In a hydrocarbon motor, the combination with a crank case, a crank shaft mounted therein, gearing arranged thereon adjacent one of its ends, a detachable cover for said gearing, an electrical device mounted on said cover with its shaft in a substantially vertical plane, a geared connection between said shafts, of a fan shaft detachably mounted on said electrical device, and means for driving said fan shaft from said crank shaft.

5. In a hydrocarbon motor, the combination with a crank case, a crank shaft mounted therein, gearing arranged thereon adjacent one of its ends, a detachable cover for said gearing, of an electrical device detachably mounted on said cover, means for driving said electrical device from said gearing, a fan shaft detachably mounted on said electrical device, and means for driving said fan shaft from said crank shaft.

6. In a hydrocarbon motor, the combination with a crank case, a crank shaft mounted therein, another shaft parallel with said crank shaft and having a geared connection therewith, and a detachable end cover for said gearing, of an electrical device detachably mounted on said cover, a geared connection between one end of said second shaft and said electrical device, a pump mechanism arranged adjacent the opposite end of said second shaft and adapted to be directly driven therefrom.

7. In a hydrocarbon motor, the combination with a crank case, a crank shaft mounted therein, another shaft parallel with said crank shaft and having a geared connection therewith, and a detachable end cover for said gearing, of an electrical device detachably mounted on said cover, a geared connection between one end of said second shaft and said electrical device, a pump mechanism arranged adjacent the opposite end of said second shaft, and another pump mechanism, one of said pump mechanisms having a direct drive connection with the opposite end of said second shaft, and the other pump mechanism also having a driving connection with the opposite end of said second shaft through a single pair of gears.

8. In a hydrocarbon motor, the combination with a crank case, a crank shaft mounted therein, another shaft parallel with said crank shaft and having a geared connection therewith, and a detachable end cover for said gearing, of an electrical device detachably mounted on said cover, a geared connection between one end of said second shaft and said electrical device, and a plurality of pump mechanisms arranged adjacent the opposite end of said second shaft and adapted to be independently driven therefrom.

9. In a hydrocarbon motor, the combination with a crank case, a crank shaft mounted therein, another shaft parallel with said crank shaft and having a geared connection therewith, and a detachable end cover for said gearing, of an electrical device detachably mounted on said cover, a geared connection between one end of said second shaft and said electrical device, and a plurality of pump mechanisms arranged adjacent the opposite end of said second shaft and adapted to be independently driven therefrom, one of said pump mechanisms having a direct driving connection and the other having a driving connection through a single pair of gears.

10. In a hydrocarbon motor, the combination with a crank case, a crank shaft mounted in bearings therein, gearing arranged adjacent one end of said shaft, and a detachable end cover for said gearing, a shaft mounted in said cover transversely to said crank shaft, a geared connection between said shafts, a pair of independent driven units detachably secured to said cover, and a detachable driving connection between each of said units and the opposite ends of said transverse shaft.

11. In a hydrocarbon motor, the combination with a crank case, a crank shaft mounted therein, a shaft parallel with said crank shaft, and gearing connecting the said shafts, of a detachable end cover for said gearing, said cover being open to the interior of the crank case and sealing the end of the latter and an electrical device mounted on said cover, said device having a shaft arranged transversely to said crank shaft and having a geared connection therewith, said device being provided with an inwardly-extending bearing sleeve extending to a point adjacent said gear connection and forming a bearing for one element thereof, said bearing sleeve being detachable from said cover with said device.

12. In a hydrocarbon motor, the combination with a crank case, a crank shaft mounted therein, a cam shaft, gear connections between said shafts, and a detachable end cover for said gearing, said cover being open to the interior of the crank case and sealing the end of the latter, of a driving gear arranged on said cam shaft, of a casing for an electrical device, mounted above said cam shaft, a shaft in said casing, a gear connecting the lower end of said shaft with said gear on said cam shaft, said casing being provided with an inwardly-extending sleeve forming a bearing for the lower end of the shaft therein adjacent the gear connection between its shaft and the cam shaft.

13. In a hydrocarbon motor, the combination with a crank case, a crank shaft mounted therein, and gearing arranged adjacent one end of said shaft and adapted to be driven therefrom, of a detachable end cover for said gearing, a plurality of driven units, comprising casings, shafts mounted in bearings therein, said driven units being detachably mounted on said cover, and means for driving said units from said crank shaft.

14. In a hydrocarbon motor, the combination with a crank case, a crank shaft mounted therein, and gearing arranged adjacent one end of said shaft and adapted to be driven therefrom, of a detachable end cover for said gearing, a plurality of driven units, comprising casings, shafts mounted in bearings therein, said driven units being detachably mounted on said cover, means for driving said units from said crank shaft, and a shaft mounted in said cover, transversely to said first shaft.

In testimony whereof I affix my signature.

D. McCALL WHITE.